(12) United States Patent
Nishizawa et al.

(10) Patent No.: US 10,725,222 B2
(45) Date of Patent: Jul. 28, 2020

(54) DISPLAY DEVICE, ELECTRONIC APPARATUS, AND LIGHT GUIDE UNIT

(71) Applicant: YAMAHA CORPORATION, Hamamatsu-shi (JP)

(72) Inventors: Kazuhiko Nishizawa, Hamamatsu (JP); Hisashi Nagai, Hamamatsu (JP); Satoshi Gougi, Hamamatsu (JP); Noritsugu Kusaba, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 194 days.

(21) Appl. No.: 16/044,736

(22) Filed: Jul. 25, 2018

(65) Prior Publication Data
US 2018/0329131 A1    Nov. 15, 2018

Related U.S. Application Data

(63) Continuation of application No. PCT/JP2017/002454, filed on Jan. 25, 2017.

(30) Foreign Application Priority Data

Jan. 29, 2016   (JP) .................. 2016-016723

(51) Int. Cl.
*F21V 21/00* (2006.01)
*F21V 8/00* (2006.01)
(Continued)

(52) U.S. Cl.
CPC ......... *G02B 6/0013* (2013.01); *G02B 6/4214* (2013.01); *G09F 13/18* (2013.01); *G09G 3/32* (2013.01)

(58) Field of Classification Search
CPC ..... G02B 6/0013; G02B 6/4214; G09F 13/18; G09G 3/32
(Continued)

(56) References Cited

U.S. PATENT DOCUMENTS 6,876,313 B2 *  4/2005  Hsiung .................. G05G 1/105
                                                     200/310
7,047,539 B2     5/2006  Miyagi
(Continued)

FOREIGN PATENT DOCUMENTS

CN          1437058 A      8/2003
CN          1892361 A      1/2007
(Continued)

OTHER PUBLICATIONS

Office Action issued in Chinese Appln. No. 201780007276.4 dated Nov. 5, 2019. English translation provided.
(Continued)

*Primary Examiner* — Laura K Tso
(74) *Attorney, Agent, or Firm* — Rossi, Kimms & McDowell LLP

(57) ABSTRACT

A display device includes: a panel including a front face and a back face; a substrate including an end face and being provided so as to abut on the back face of the panel; a light emitting element provided on the substrate so as to emit light toward the panel in parallel to the substrate; and a light guide body provided interposed between the end face of the substrate and the back face of the panel, the light guide body guiding light incident from the light emitting element, to a side of the front face of the panel, and transmitting the light.

10 Claims, 13 Drawing Sheets

(51) Int. Cl.
*G09F 13/18* (2006.01)
*G02B 6/42* (2006.01)
*G09G 3/32* (2016.01)

(58) Field of Classification Search
USPC ............ 362/23.09, 23.11, 23.16, 23.18, 602
See application file for complete search history.

(56) References Cited

U.S. PATENT DOCUMENTS

| | | | |
|---|---|---|---|
| 7,178,964 | B2 | 2/2007 | Sugiura |
| 7,695,149 | B2 * | 4/2010 | Yukawa ................ G06F 1/1615 |
| | | | 362/23.13 |
| 8,757,824 | B2 * | 6/2014 | Baker ................... G01D 13/22 |
| | | | 362/23.01 |
| 2004/0017739 | A1 | 1/2004 | Miyagi |
| 2007/0008739 | A1 | 1/2007 | Kim |
| 2015/0043196 | A1 | 2/2015 | Fleig et al. |

FOREIGN PATENT DOCUMENTS

| | | |
|---|---|---|
| CN | 204498317 U | 7/2015 |
| CN | 204665164 U | 9/2015 |
| JP | H06083275 A | 3/1994 |
| JP | H0736397 A | 2/1995 |
| JP | H0916096 A | 1/1997 |
| JP | 2001071813 A | 3/2001 |
| JP | 2001184003 A | 7/2001 |
| JP | 3091592 U | 2/2003 |
| JP | 2005197013 A | 7/2005 |
| JP | 2012019524 A | 1/2012 |
| JP | 4904829 * | 3/2012 |
| JP | 5353128 B2 | 11/2013 |
| JP | 2015076308 A | 4/2015 |

OTHER PUBLICATIONS

International Search Report issued in Intl. Appln. No. PCT/JP2017/002454 dated May 9, 2017. English translation provided.

Written Opinion issued in Intl. Appln. No. PCT/JP2017/002454 dated May 9, 2017.

Office action issued in Japanese Appln. No. 2016-016723 dated Jan. 7, 2020. English translation provided.

* cited by examiner

DISPLAY DEVICE, ELECTRONIC APPARATUS, AND LIGHT GUIDE UNIT

CROSS REFERENCE TO RELATED APPLICATIONS

The present application is a continuation application of International Patent Application No. PCT/JP2017/002454, filed on Jan. 25, 2017, which claims priority to Japanese Patent Application No. 2016-016723, filed on Jan. 29, 2016. The contents of these applications are incorporated herein by reference in their entirety.

BACKGROUND OF THE INVENTION

1. Field of the Invention

Preferred embodiments according to the present invention relates to a display device that displays an operation state or other states by the presence or absence of light emission, an electronic apparatus including the display device, and a light guide unit used for the display device.

2. Description of the Related Art

As a display device that displays an operation state or other states by the presence or absence of light emission, for example, Japanese Unexamined Patent Application Publication No. H06-083275 discloses a display device including: a light emitting element that is mounted on a substrate (a printed board) and emits light toward the upper side of the substrate; and a light transmissive member (specifically, a light guide portion such as a prism) that is disposed adjacent to the light emitting element on the upper side of the substrate and includes an inclined surface that reflects light from the light emitting element, and a display portion from which the reflected light is transmitted. In this display device, the substrate including the light emitting element is mounted perpendicular to a front panel. The light transmissive member includes a display portion and is fixed to the front panel such that the display portion is inserted to a through hole of the front panel and that the upper peripheral wall of the light transmissive member is in contact with the front panel.

In addition, Japanese Patent No. 5353128 discloses a display device including: a panel; a substrate attached so as to abut on the panel through a substrate fixing portion; a light emitting element mounted on the substrate; and a light guide unit fixed to the panel. The light guide unit of this display device includes a light guide portion provided on the lower face of the substrate and guiding light of the light emitting element that emits light toward a lower side from the substrate to the panel; and a cover portion covering the light guide portion to prevent light leakage. The light guide unit is fixed to the panel such that a flange portion provided at the cover portion is attached on the reverse face of the panel. In addition, the substrate including the light emitting element and the light guide unit including the light guide portion are able to be positioned such that the end portion of the substrate, on the side of the panel, is in contact with the flange portion and that a pin of the cover portion is inserted to a fitting hole provided in the substrate.

However, in such a display device disclosed in Japanese Unexamined Patent Application Publication No. H06-083275 and Japanese Patent No. 5353128, the configuration in which light of the light emitting element that emits light toward the upper face or the lower face of the substrate is incident on the light guide unit provided on the upper side or the lower side of the substrate causes a problem such that the entire display device becomes larger in size and the display device is not able to be disposed in the vicinity of a terminal component such as a jack. Then, the reduction in size of the display device is demanded in attempt to overcome such a problem, but the reduction in size of the display device makes the handling and assembly more difficult, so that improvement of assembling workability of the display device has also been demanded.

SUMMARY OF THE INVENTION

One aspect of the present invention has been made in consideration of the above-described circumstances, and is to provide a display device, an electronic apparatus, and a light guide unit that are capable of reducing in size and being easily assembled.

A display device includes: a panel including a front face and a back face; a substrate including an end face and being provided so as to abut on the back face of the panel; a light emitting element provided on the substrate so as to emit light toward the panel in parallel to the substrate; and a light guide body provided interposed between the end face of the substrate and the back face of the panel, guiding light incident from the light emitting element, to a side of the front face of the panel, and transmitting the light.

Preferred embodiments of the present invention, the light emitting element is provided in a small space between other components such as terminal components to be disposed on the substrate, which increases the density of components of the substrate, so that the size of the display device is reduced, and the display device is able to be easily assembled.

The above and other elements, features, characteristics, and advantages of the present invention will become more apparent from the following detailed description of the preferred embodiments with reference to the attached drawings.

DETAILED DESCRIPTION OF THE PREFERRED EMBODIMENTS

Figure 1:
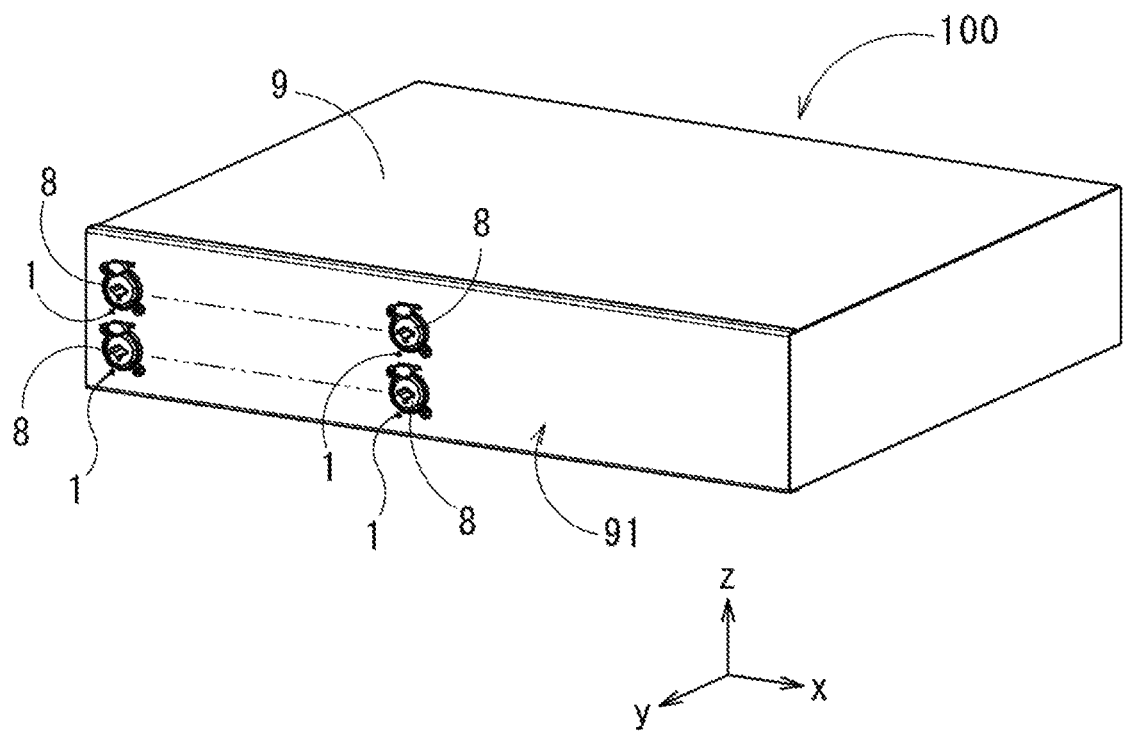
FIG. 1 is a perspective view of the entirety of an electronic apparatus using a display device according to a preferred embodiment of the present invention.

A display device according to a preferred embodiment of the present invention includes: a panel including a front face and a back face; a substrate including an end face and being provided so as to abut on the back face of the panel; a light emitting element provided on the substrate so as to emit light toward the panel in parallel to the substrate; and a light guide body provided interposed between the end face of the substrate and the back face of the panel, guiding light incident from the light emitting element, to a side of the front face of the panel, and transmitting the light.

In this display device, the entirety or the main portion of the light guide body is not disposed on the upper face side (the upside) or the lower face side (the downside) of the substrate, but is disposed between the end face of the substrate and the panel; and light from the light emitting element mounted in the vicinity of the end face on the substrate is incident on the light guide body. As a result, the light emitting element is provided in a small space between other components such as terminal components to be disposed on the substrate, which increases the density of components of the substrate, so that the size of the entire display device is able to be reduced. In addition, since the light guide body is held by being interposed between the end face of the substrate and the back face of the panel, the assembly of the display device is able to be easily performed.

In a display device according to a preferred embodiment of the present invention, the substrate may preferably include an upper face; the light guide body may preferably include: a light incident portion provided to protrude from the upper face of the substrate, the light incident portion being a portion on which the light of the light emitting element is incident, and a light transmitting portion transmitting the light in a direction away from the end face of the substrate; the panel may preferably include an opening exposing the light transmitting portion of the light guide body on the side of the front face of the panel; the opening and the end face of the substrate may preferably be provided to face each other; and the light guide body may preferably be provided between the opening and the end face of the substrate.

The opening and the end face of the substrate are disposed to face each other, so that a large portion of the light guide body is able to be disposed within the thickness of the substrate between the end face of the substrate and the panel, and thus the size of the display device is able to be further reduced.

In a display device according to a preferred embodiment of the present invention, the opening may preferably be provided as a hole penetrating the panel in a thickness direction of the panel; and the light transmitting portion may be fitted in the opening.

The light transmitting portion of the light guide body is fitted in the opening of the panel, which enables appropriate positioning of the panel and the light guide body to be easily performed and thus improves assembling workability.

In a display device according to a preferred embodiment of the present invention, the light guide body may preferably be temporarily fixed to the panel.

Before the light guide body is disposed between the end face of the substrate and the panel, the light guide body is temporarily fixed to the panel in advance, so that the panel and the light guide body are able to be integrally handled, and thus the assembling workability is able to be improved. Specifically, a double-sided adhesive tape or the like is attached on the back face of the panel in advance, and the light guide body is able to be temporarily fixed to the panel with this double-sided adhesive tape.

In a display device according to a preferred embodiment of the present invention, the light guide body may preferably include a cover member covering the light guide body to prevent light leakage; the substrate may preferably include an end portion; and the cover member may preferably include a concave portion in which the end portion of the substrate is fitted.

By using the concave portion provided at the cover member as a guide, the light guide unit is able to be accurately positioned and assembled. In addition, the end portion of the substrate is fitted in the concave portion of the cover member, which causes the cover member to cover the periphery of the light emitting element, so that, in an electronic apparatus including a light emitting device, light is able to be prevented from leaking from the light guide body to the inside of a housing of the electronic apparatus and light in the housing is able to be prevented from leaking to the light guide body.

In a display device according to a preferred embodiment of the present invention, the end portion of the substrate may preferably include a cutout portion; and the cutout portion and the concave portion may preferably be fitted in each other.

The cutout portion provided in the substrate and the concave portion of the cover member are fitted to each other, so that the light guide unit is able to be more securely positioned.

An electronic apparatus according to a preferred embodiment of the present invention includes the above-described display device; and a terminal component exposed on the front face of the panel, the terminal component being mounted on the substrate.

A light guide unit according to a preferred embodiment of the present invention includes: a light guide body including: a front face; a back face; a light incident portion on the back face; and a light transmitting portion on the front face, the light guide body guiding light incident through the light incident portion to the light transmitting portion and transmitting the light; and a cover member including: a front face; a back face; a mounting surface for a panel, on a side of the front face; and a concave portion in which an end portion of a substrate is fitted, on a side of the back face, the concave portion has substantially the same height as the light transmitting portion, and the cover member surrounds the upper, lower, right, and left side portions of the light guide body to prevent light leakage.

In a light guide unit according to a preferred embodiment of the present invention, the light incident portion, when the substrate is fitted in the concave portion, may preferably be provided at a position at which light of a light emitting element provided on the substrate is incident.

In a light guide unit according to a preferred embodiment of the present invention, the light transmitting portion may preferably be provided in a convex shape that protrudes from the mounting surface and may also preferably be provided so as to be inserted to an opening provided in the panel.

Hereinafter, preferred embodiments of the present invention will be described with reference to the drawings.

FIG. 1 is a view of an electronic apparatus including a display device according to a preferred embodiment of the present invention. Hereinafter, an electronic apparatus 100 shown in FIG. 1 will be described as an example.

The electronic apparatus 100, as shown in FIG. 1, includes a housing 9 made into a rectangular shape as a whole, and a display device 1 is provided on a panel 91 disposed on a side of the front face of this housing 9. It is to be noted that, while the electronic apparatus 100 includes a terminal component 8 (an XLR type jack that connects a microphone or other components) mounted on a substrate 2 disposed in the housing 9 and a plurality of components such as a controller, only some of these components are displayed in FIG. 1.

In the following description, the side of the panel 91 is defined as the front side (the front face side, the main front face side) of the electronic apparatus 100, the side opposite to the panel 91 is defined as the back side (the rear face side, the back face side) of the electronic apparatus 100, the left direction from the front side to the back side of the electronic apparatus 100 is defined as the left side of the electronic apparatus 100, and the right direction is defined as the right side of the electronic apparatus 100. In addition, the horizontal direction of the electronic apparatus 100 is defined as an x direction, the longitudinal direction of the electronic apparatus 100 is defined as a y direction, and the vertical direction of the electronic apparatus 100 is defined as a z direction.

Figure 2:
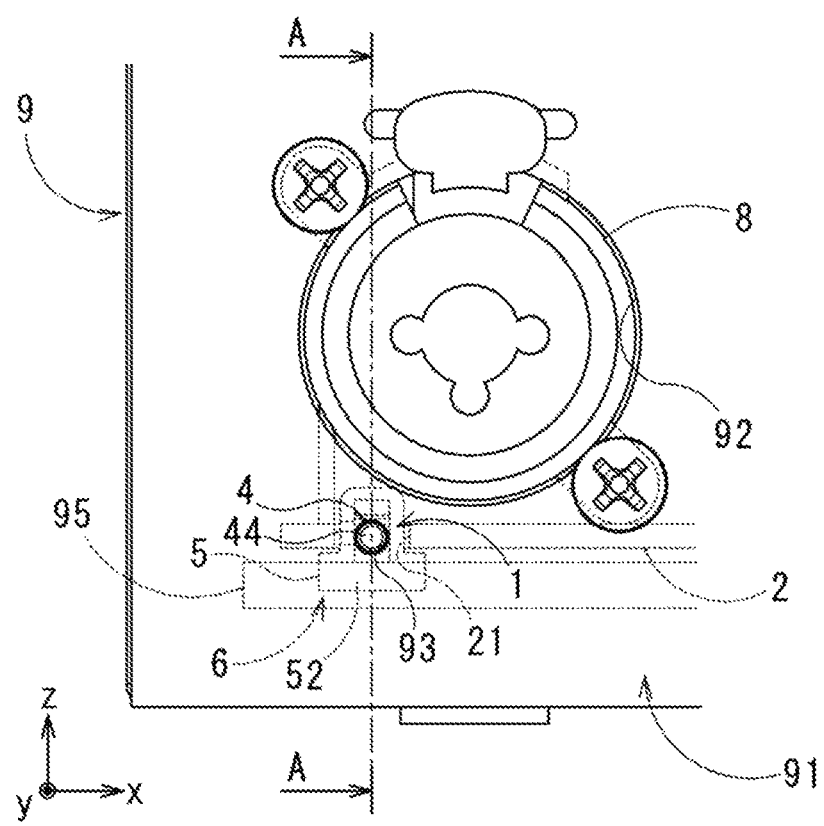
FIG. 2 is a view of a main portion as viewed from a main front face of the electronic apparatus as shown in FIG. 1.
Figure 8:
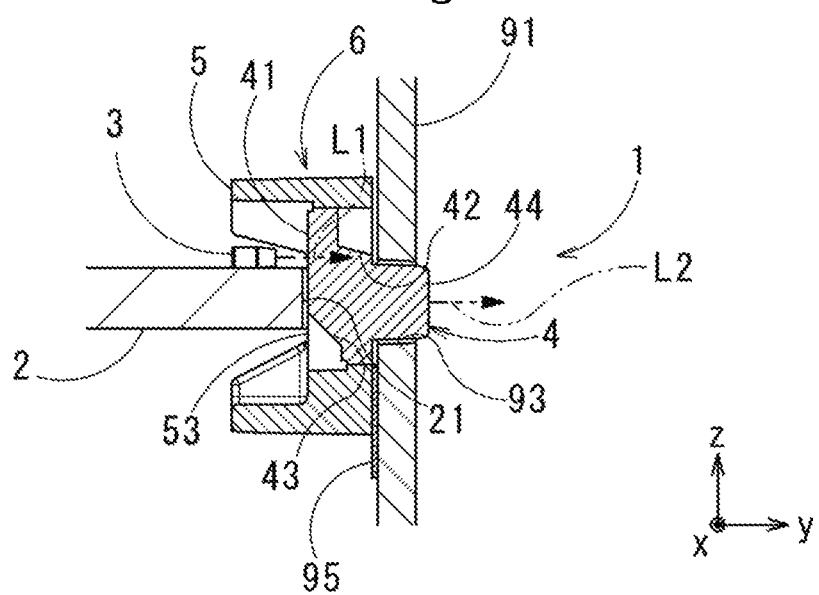
FIG. 8 is a sectional view of a main portion of an electronic apparatus at the same position as the electronic component shown in FIG. 6, and is a view illustrating a procedure of assembling a display device.

The display device 1, as shown in FIG. 8, includes a panel 91, a substrate 2, an LED chip 3 as a light emitting element, a light guide body 4 that guides light incident from the LED chip 3, to the front face side of the panel 91, and transmits the light, and a cover member 5 that covers the light guide body 4 and prevents light leakage. The panel 91, as described above, is provided on the main front surface of the housing 9 that configures the electronic apparatus 100. Then, the panel 91, as shown in FIG. 2, includes a through hole 92 to expose the terminal component 8 disposed in the housing 9 to the outside of the housing 9, that is, the side of the front face side of the panel 91; and an opening 93 to expose a light transmitting portion 44 of the light guide body 4 to the front face side of the panel 91.

In such a case, the display device 1 may be an indicator that shows a state of function (the on/off state of a phantom power supply for a microphone, the presence/absence of an input signal, the magnitude of a signal level, or other states, for example) according to each terminal component 8, and the electronic apparatus 100 includes display devices 1 of the same number as the number of terminal components 8. For example, in a case in which the phantom power supply of the terminal component 8 is on, electricity is supplied from a controller (not shown) on the substrate 2 to a corresponding LED chip 3, and the LED chip 3 emits light. On the other hand, in a case in which the phantom power supply of the terminal component 8 is off, electricity is not supplied to the LED chip 3, and the LED chip 3 does not emit light.

It is to be noted that the panel 91 and the substrate 2 configuring each display device 1 are not necessarily provided so as to be equal in number to the display devices 1 and that the number of panels 91 and the number of substrates 2 may be smaller than the number of display devices 1. In an example shown in FIG. 1, a plurality of the terminal components 8 (eight terminal components, for example) form a row by being aligned in the horizontal direction (the x direction) of the panel 91, and such a row is aligned in two rows in the longitudinal direction (the z direction). Therefore, the panel 91 disposed on the front face side of the housing 9 includes through holes 92 of the same number (two rows of eight through holes, for example) as the number of terminal components 8, in upper and lower two rows. In addition, the LED chip 3, in the same manner as the terminal component 8, includes LED chips 3 disposed in upper and lower two rows, and the panel 91 includes openings 93 of the same number as the number of LED chips 3, in upper and lower two rows.

Figure 9:
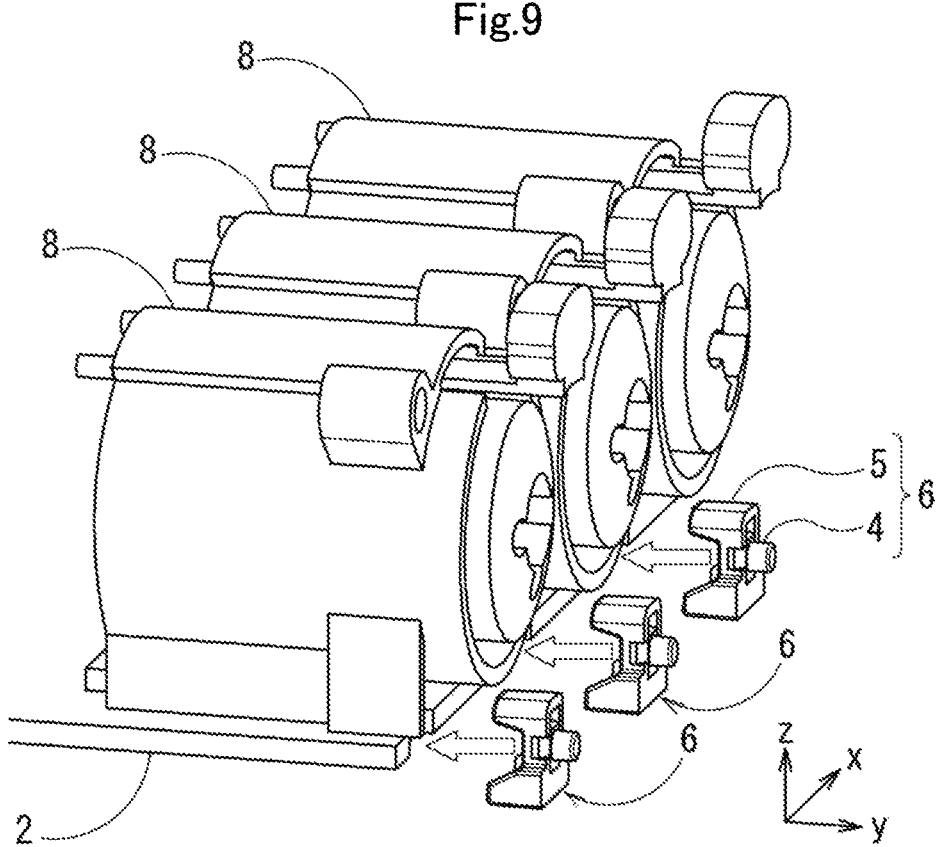
FIG. 9 is a perspective view of a main portion of a substrate provided in the electronic apparatus shown in FIG. 1.
Figure 10:
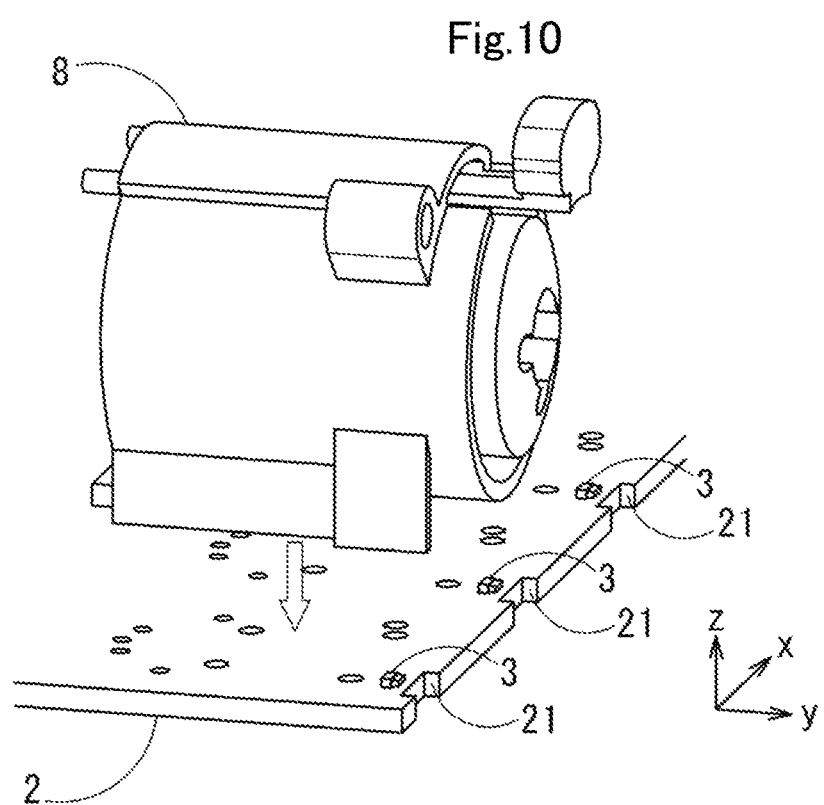
FIG. 10 is a perspective view of the main portion of the substrate corresponding to FIG. 9, and shows a state in which a terminal component has been removed.

In addition, the substrate 2 disposed in the housing 9 includes upper and lower two substrates, and, on each of the substrates 2, as shown in FIG. 9 and FIG. 10, the plurality of terminal components 8 and the LED chips 3 of the same number as the number of terminal components 8 are mounted in a row. In this manner, in the electronic apparatus 100, the panel 91 and the substrate 2 are shared in the plurality of display devices 1. In the electronic apparatus 100, an opening 93 provided in the panel 91 is formed as a hole that penetrates the panel 91 in the thickness direction of the panel 91.

The substrate 2, as shown in FIG. 2 and FIG. 8, is disposed so as to abut on the back face of the panel 91 and mounted in a direction (the y direction) intersecting (perpendicular to, for example) the panel 91. It is to be noted that the substrate 2 is fixed to the bottom side of the housing 9 with a screw or the like. Then, on this substrate 2, as described above, the terminal component 8 and the LED chip 3 are mounted.

Figure 3:
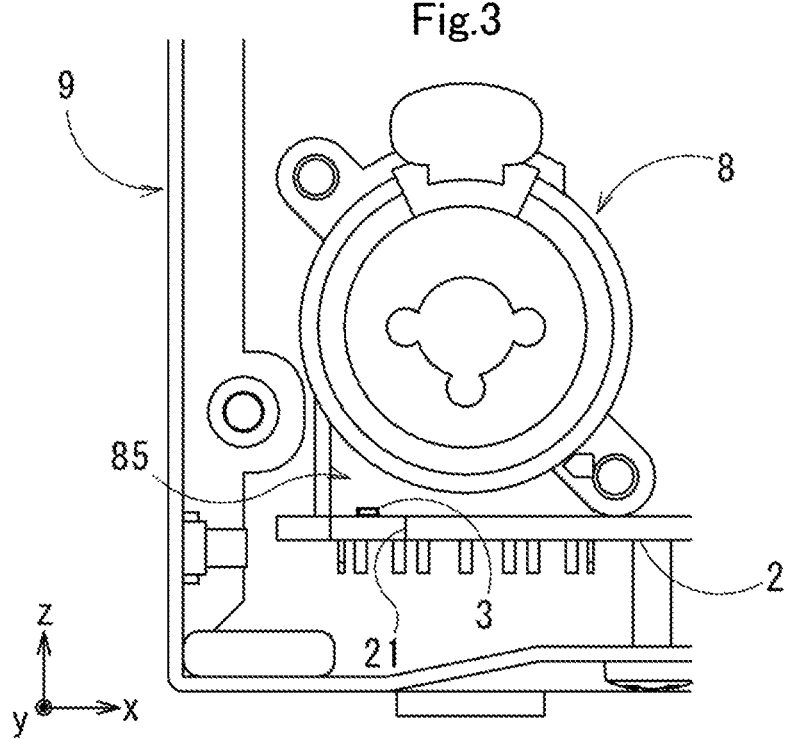
FIG. 3 is a view of a main portion in a state in which a panel is removed to open a housing in the electronic apparatus as shown in FIG. 2.

In addition, each of the LED chips 3, as shown in FIG. 8, is disposed on the substrate 2 in the vicinity of a corresponding terminal component 8 so as to emit light in parallel with the substrate 2. Specifically, as shown in FIG. 3, the terminal component 8 has an outer surface formed in a cylindrical shape, and, when the terminal component 8 is disposed on the substrate 2 with the axial direction set in a planar direction (y direction), a small space 85 is formed between the cylindrical outer surface of the terminal component 8, and the substrate 2. Each of the LED chips 3 is disposed in the small space 85 provided between this terminal component 8 and the substrate 2. In addition, the end portion of the substrate 2 includes a cutout portion 21 in which the cover member 5 is fitted. Although this cutout portion 21 is not necessarily provided, by providing the cutout portion 21, a light guide unit 6 to be described below is able to be more securely positioned. It is to be noted that the terminal component 8 is not limited to a cylindrical shape. For example, when the terminal component 8 has a rectangular parallelepiped shape and there is a space 85 between the terminal component 8 and the substrate 2, the LED chips 3 are disposed in the space 85.

The light guide body 4 is configured of a member having light guide characteristics, such as an acrylic resin, and, as shown in FIG. 8, is disposed interposed between the end face of the substrate 2, and the back face of the panel 91. This light guide body 4 includes a light incident portion 41 on which light is incident from the LED chips 3, two reflecting portions 42 and 43 that change the direction of the incident light, and a light transmitting portion 44 that transmits the light of which the direction has been changed in a direction away from the end face of the substrate 2.

The light incident portion 41, as shown in FIG. 8, is disposed to face the LED chip 3 on the substrate 2, above the substrate 2, on the side of the substrate 2 of the light guide body 4, and is provided so that the light from the LED chip 3 may be incident on the light incident portion 41. In addition, the reflecting portion 42 as one of the two reflecting portions 42 and 43 is provided at a position facing the light incident portion 41, at substantially the same height as the light incident portion 41, and reflects light L1 in the horizontal direction (the y direction) in a downward direction, the light being incident from the light incident portion 41. Therefore, the reflecting portion 42 is formed as a downward inclined plane that is separated from the light incident portion 41 toward the lower side. Then, the reflecting portion 43 as the other is provided at a position facing the reflecting portion 42 at substantially the same height as the end face of the substrate 2 on the side lower than the light incident portion 41, and reflects the light L1 that has been reflected by the reflecting portion 42, in parallel to the substrate 2, toward the panel 91 (the light transmitting portion 44). Therefore, the reflecting portion 43 is formed as a upward inclined plane that approaches the panel 91 toward the lower side.

In addition, the light transmitting portion 44 is provided at a position that faces the reflecting portion 43 of the other at substantially the same height as the substrate 2 (and a concave portion 53 to be described below), the light L1 that has been reflected by the reflecting portion 43 of the other is transmitted from the light transmitting portion 44 in the direction (the y direction) away from the end face of the substrate 2. It is to be noted that light L2 that is transmitted from this light transmitting portion 44 is substantially in parallel to light that is incident from the LED chip 3 to the light incident portion 41. In this manner, the light of the LED chip 3 sequentially changes an advancing direction in a process of penetrating the light guide body 4, and, eventually, is transmitted at substantially the same height as the substrate 2, in a direction away from the end face of the substrate 2. In addition, the light transmitting portion 44 of the light guide body 4 is formed in a cylindrical convex shape, and is able to be inserted to the opening 93 of the panel 91. Then, the opening 93 of the panel 91 and the end face of the substrate 2 are disposed facing each other, and, while the light transmitting portion 44 of the light guide body 4 is fitted in the opening 93, the light guide body 4 is interposed between the opening 93 and the end face of the substrate 2. It is to be noted that the light transmitting portion 44 may have a shape other than a cylinder, such as a square pillar, and, in accordance with the shape, the shape of the opening 93 may be changed into a shape in which the light transmitting portion 44 is fitted.

Figure 11:
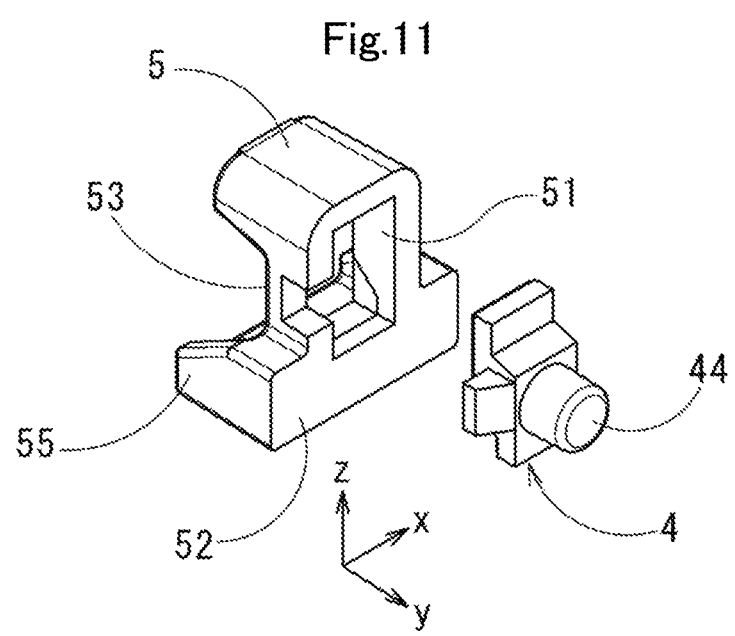
FIG. 11 is a perspective view illustrating a light guide body and a cover member that configure a light guide unit.
Figure 12:
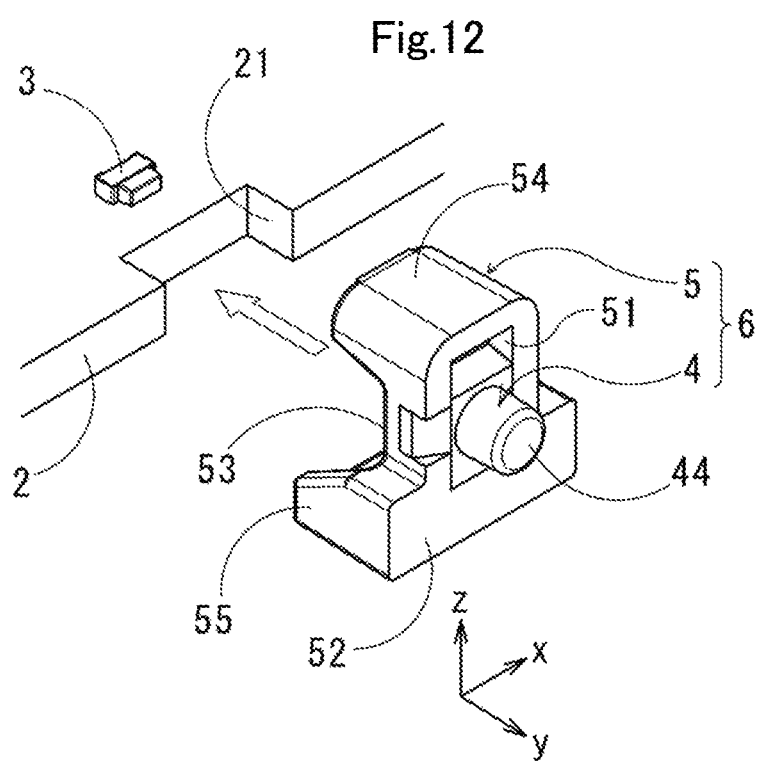
FIG. 12 is a perspective view illustrating a positional relationship between the light guide unit and the substrate.

The cover member 5 is made of a shielding member such as a synthetic resin. This cover member 5 covers the light guide body 4 so as to prevent light leakage from the LED chip 3 and the light guide body 4 to the inside of the housing 9, and, as shown in FIG. 11 and FIG. 12, includes an insertion hole 51 formed in a frame shape to surround the upper, lower, right, and left side portions of the light guide body 4, the insertion hole 51 being a hole in which the light guide body 4 is to be fitted. The cover member 5 includes an upper portion provided so as to protrude to the upper face side of the substrate 2, and a lower portion provided so as to protrude to the lower face side of the substrate 2 and having a width (the width in the x direction) larger than the upper portion. In the upper portion and the lower portion of the cover member 5, a larger width has better light blocking characteristics, and, while, in terms of the light blocking characteristics, the upper portion of the cover member 5 preferably has a large width as the lower portion, the width of the upper portion is smaller than the width of the lower portion so as to avoid the interference of the terminal component 8. The front face of the cover member 5 is formed in a flat plane similar to the back face of the panel 91, and a mounting surface 52 for the panel 91 is provided in a large width portion of the front-face lower portion of the cover member 5 so as to increase an area in which the panel 91 is attached.

It is to be noted that the light transmitting portion 44 of the light guide body 4, as mainly shown in FIG. 8, is provided in a convex shape (a cylindrical convex shape in the present preferred embodiment) protruding closer to the panel 91 than to the front face (the mounting surface 52 for the panel 91) of the cover member 5. On the other hand, the cover member 5, on the back face side, includes a concave portion 53 in which the end portion of the substrate 2 is to be fitted; an upper flange portion 54 protruding to the upper face side of the substrate 2 when the end portion of the substrate 2 is fitted in the concave portion 53; and a lower flange portion 55 protruding to the lower face side of the substrate 2 when the end portion of the substrate 2 is fitted in the concave portion 53. Then, the side wall of the concave portion 53, the upper flange portion 54, and the lower flange portion 55 cover a portion other than the light transmitting portion 44 of the light guide body 4 in the vertical direction (the z direction) and the horizontal direction (the x direction). In addition, the upper flange portion 54 covers the LED chip 3 mounted on the substrate 2, and a space from the LED chip 3 to the light incident portion 41 of the light guide body 4, when the substrate 2 is fitted in the concave portion 53.

Then, the light guide body 4 and the cover member 5 that are configured in the above-described manner define a light guide unit 6 in such a manner that the light guide body 4 is fitted in the insertion hole portion 51 of the cover member 5 and the light guide body 4 and the cover member 5 are unitized. It is to be noted that the light guide body 4 and the cover member 5 may be unitized with high precision by being molded into one unit with use of a two-color molding technique. In such a case, the cover member 5 may be formed after the light guide body 4 is formed or the light guide body 4 may be formed after the cover member 5 is formed.

Subsequently, a description will be made of a procedure when an assembler who assembles an electronic apparatus assembles portions of the above-described display device 1.

Figure 4:
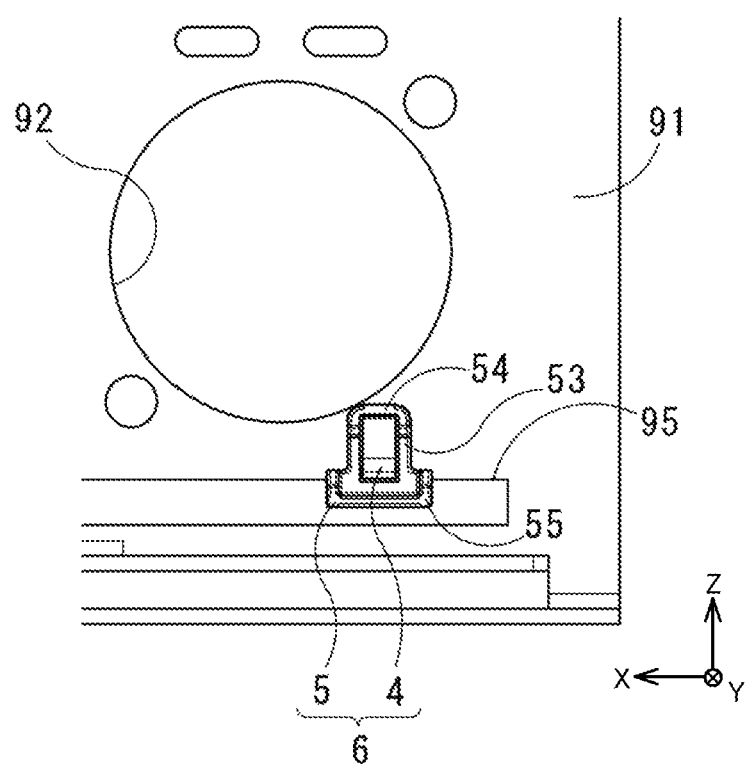
FIG. 4 is a view of a main portion of a panel of the electronic apparatus as viewed from the side of the back face of the electronic apparatus shown in FIG. 2.
Figure 5:
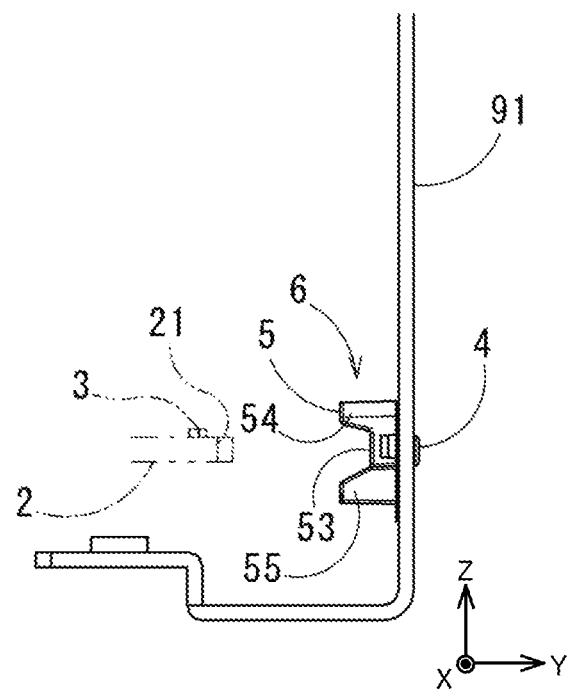
FIG. 5 is a side view of the panel shown in FIG. 4.
Figure 6:
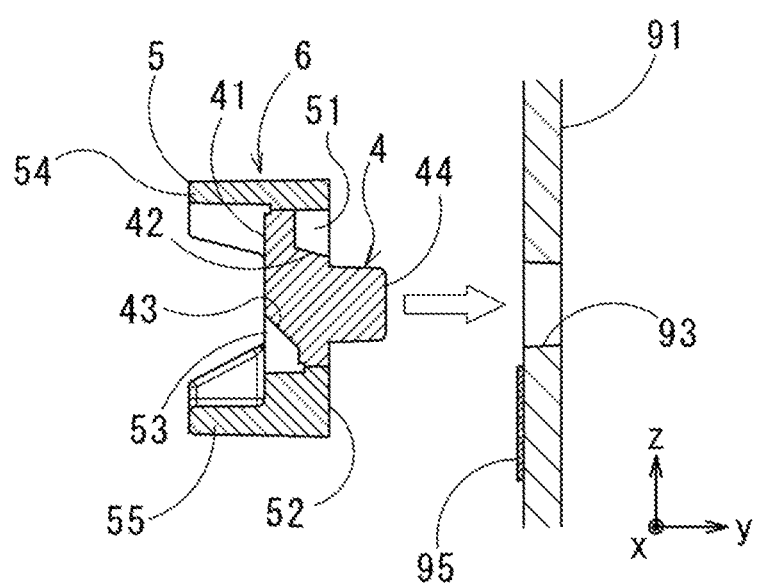
FIG. 6 is a sectional view of a main portion in a direction taken along a line A-A shown in FIG. 2, and is a diagram illustrating a procedure of assembling a display device.
Figure 7:
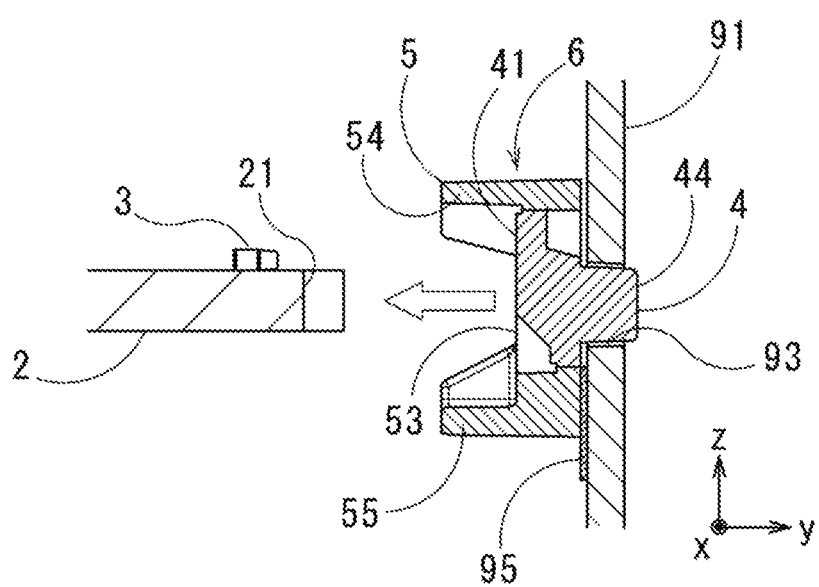
FIG. 7 is a sectional view of a main portion of an electronic apparatus at the same position as an electronic apparatus shown in FIG. 6, and is a view illustrating a procedure of assembling a display device.

The assembler, as shown in FIG. 3, first screws and fixes the substrate 2 on which the LED chip 3 is mounted to the bottom or another portion of the housing 9. At this time, the front face side of the housing 9 is open. In addition, the assembler, as shown in FIG. 6 and FIG. 7, by using a double-sided adhesive tape 95 or the like, attaches the front-face lower portion (the mounting surface 52) of the light guiding unit 6 on the back face of the panel 91, and temporarily fixes the light guide unit 6 to the panel 91. At this time, the light transmitting portion 44 of the light guide body 4 of each light guide unit 6 is inserted to the opening 93 of the panel 91. As a result, the light guide unit 6 is positioned in an appropriate position on the panel 91. It is to be noted that, as shown in FIG. 2 and FIG. 4, the double-sided adhesive tape 95 has an elongated shape, and is attached such that the longitudinal direction of the double-sided adhesive tape 95 extends along the horizontal direction (the x direction), immediately below a plurality of openings 93 of the panel 91. In other words, although a plurality of light guide units 6 are attached on this one double-sided adhesive tape 95, every one of the plurality of light guide units 6 may be attached on the panel 91 with one double-sided adhesive tape, with use of a piece of the double-sided adhesive tape. In addition, in place of the double-sided adhesive tape, an adhesive may be used.

Subsequently, the assembler puts the panel 91 over the opening on the front face side of the housing 9. At this time, the front side end portion of the substrate 2 that is exposed through the opening on the front face side of the housing 9 is disposed so as to be fitted in the concave portion 53 of the cover member 5. Even when the position of the light guide unit 6 on the panel 91 is more or less displaced, the concave portion 53 of the light guide unit 6 is pressed by a cutout portion 21 provided at the end portion of the substrate 2 when the panel 91 is put, the light guide unit 6 is positioned at a correct position. As a result, as shown in FIG. 8, each light guide unit 6 is interposed and held between the end face of the substrate 2 and the back face of the panel 91 in a state in which the LED chip 3 on the substrate 2 and the light transmitting portion 44 of each light guide body 4 are disposed to face each other. Then, the assembler fixes the panel 91 to the opening of the housing 9 with a screw (not shown), and completes the assembly of the portions related to the display device 1. While, in this example, the substrate 2 is attached to the housing 9 and then covered with the panel 91 and fixed to each other, this procedure may be reversed and, the panel 91 may first be put over the housing 9 and fixed to each other and then the substrate 2 may be fixed to the housing 9. In addition, the assembly of the display device 1 may be performed by a robot in place of the assembler.

In the display device 1 configured as described above, the light guide unit 6 (the light guide body 4) is not disposed on the upper face side (the upside) or the lower face side (the downside) of the substrate 2, but is disposed between the end face of the substrate 2 and the panel 91; and light from a small LED chip 3 (the light emitting element) mounted in the vicinity of the end face on the substrate 2 is incident on the light guide unit 6. As a result, by providing the LED chip 3 (the light emitting element) and the light guide unit 6 (the light guide body 4) in a small space 85 between other components such as terminal components 8 to be disposed on the substrate 2, the density of components of the substrate 2 is able to be increased, and the size of the entire display device 1 is able to be reduced. In addition, since the light guide unit 6 (the light guide body 4), as shown in FIG. 8, is held by being interposed between the end face of the substrate 2 and the back face of the panel 91, the assembly of the display device 1 is able to be easily performed.

In addition, the light guide unit 6 (the light guide body 4) is able to be stably held in the correct position by making the opening 93 of the panel 91 and the end face of the substrate 2 face each other to interpose the light guide unit 6 between the end face of the substrate 2 and the back face of the panel 91. In addition, like the present preferred embodiment, the opening 93 is defined as a hole penetrating the panel 91 in the thickness direction, and the light transmitting portion 44 of the light guide body 4 is fitted in the opening 93, so that appropriate positioning of the light guide body 4 on the panel 91 is able to be easily performed. Further, before the end face of the substrate 2 and the panel 91 are disposed to face each other, the light guide body 4 is temporarily fixed to the panel 91 in advance, so that the panel 91 and the light guide body 4 are able to be integrally handled, and thus the assembling workability is able to be improved.

In addition, by providing the concave portion 53 in which the end portion of the substrate 2 is fitted, with the cover member 5, positioning of the light guide unit 6 and the substrate 2 is able to be easily performed by using this concave portion 53 as a guide. In other words, since the substrate 2 is fitted in along the concave portion 53, even when the light guide unit 6 rises more or less from the opening 93, the light guide unit 6 is able to be pushed by the end portion of the substrate 2, and, even when the direction of the light guide unit 6 with respect to the substrate 2 is deviated, the direction is able to be corrected. In addition, the end portion of the substrate 2 is fitted in the concave portion 53 of the cover member 5, which causes the cover member 5 to cover the periphery of the LED chip 3, so that light is able to be prevented from leaking from the LED chip 3 and the light guide body 4 to the inside of the housing 9 and light in the housing 9 is able to be prevented from leaking to the light guide body 4.

Further, in the electronic apparatus 100, the end portion of the substrate 2 includes a cutout portion 21, and the cutout portion 21 and the concave portion 53 of the light guide unit 6 are fitted in each other, which is able to further prevent light of the light guide body 4 from leaking from the concave portion 53 in a lateral direction and more securely perform the positioning of the light guide unit 6. In addition, since a portion of the light guide unit 6, that is, a portion of the light guide body 4 and the cover member 5 is accommodated in the cutout portion 21 of the substrate 2, the area of the substrate 2 is able to be expanded to be close to the panel 91. Thus, the electronic apparatus 100 is able to be configured excellent in space efficiency.

Figure 13:
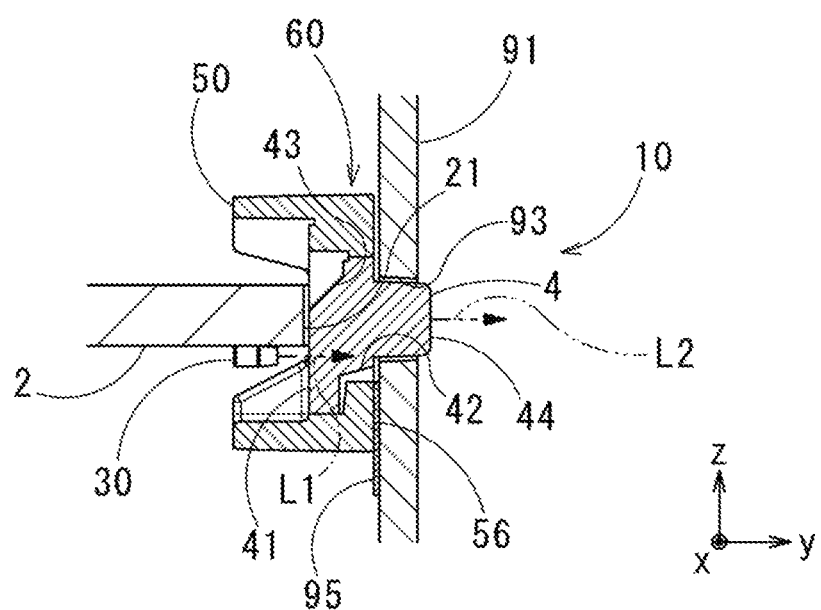
FIG. 13 is a sectional view of a main portion of a display device according to other preferred embodiments of the present invention.

It is to be noted that, while the display device 1 according to the above-described preferred embodiment is configured to mount the LED chip 3 on the upper face (the side on which the terminal component 8 is disposed) of the substrate 2, like the display device 10 shown in FIG. 13, a display device is also able to be configured such that a light guide unit 60 having the light guide body 4 of which the top and bottom are reversed is prepared, an LED chip 30 is mounted on the lower face (the side on which no terminal component 8 is disposed) of the substrate 2, and light from the LED chip 30 is guided by the light guide body 4. In such a case, the cover member 50 of the light guide unit 60, in the same manner as the cover member 5 of the display device 1, may be provided so as to include an upper portion protruding to the upper face of the substrate 2, a lower portion provided so as to protrude to the lower face of the substrate 2 and having a width (the width in the x direction) larger than the upper portion, and a mounting surface 56 on which the panel 91 is temporarily fixed, on the front-face lower portion of the cover member 50.

In addition, while, in the display device 1 according to the above-described preferred embodiment, the entirety of the light guide body 4 is disposed between the end face of the substrate 2 and the panel 91, the main portion of the light guide body 4 may be disposed between the end face of the substrate 2 and the panel 91, and all or a portion of the light incident portion 41 of the light guide body 4 may be disposed so as to protrude to the upper face or the lower face of the substrate 2.

Further, while the display device 1 according to the above-described preferred embodiment includes an opening 93 formed by a hole that penetrates the panel 91 in the thickness direction and transmits light, the opening 93 is able to be omitted by the panel 91 made of a transparent material such as acrylic. In such a case, the light transmitting portion 44 of the light guide body 4 may be formed in a flat shape so as not to protrude from the mounting surface 52 for the panel 91.

It is to be noted that the present invention is not limited to the above-described preferred embodiments and that various improvements and modifications are possible in a scope without departing from the gist of the present invention.

For example, while, in the above-described preferred embodiment, the display device 1 is provided at the panel 91 on the main front face side of the housing 9, the display device 1 may be provided at the panel on any side of the main front face, back face, upper face, lower face (bottom face), right side face, and left side face of the housing. In addition, a display device may be provided in each of a plurality of panels configuring a housing.

The terminal component to be mounted on the substrate 2 is not limited to an XLR type jack and may be a terminal component of a type of being attached to a substrate while the axial direction of the terminal component is in parallel to the substrate, such as an RJ45 jack and a speaker jack. Further, while, in the above-described preferred embodiment, the display device 1 is provided as an indicator that indicates a state of functions related to each terminal component 8, the display device according to the present invention is not related to a terminal component and is widely applicable to a display device that guides light from a light emitting element from the back face side to front face side of the panel and transmits the light in a limited space.

Finally, the above described embodiments are to be considered in all respects as illustrative and not restrictive. The scope of the present invention is defined not by above described embodiments but by the claims. Further, the scope of the present invention is intended to include all modifications that come within the meaning and scope of the claims and any equivalents thereof.

What is claimed is:

1. A display device comprising:
   a panel including a front face and a back face;
   a substrate including an end face and being provided so as to abut on the back face of the panel;
   a light emitting element provided on the substrate so as to emit light toward the panel in parallel to the substrate; and
   a light guide body provided interposed between the end face of the substrate and the back face of the panel, the light guide body guiding light incident from the light emitting element, to a side of the front face of the panel, and transmitting the light.

2. The display device according to claim 1, wherein:
   the substrate includes an upper face;
   the light guide body includes:
   a light incident portion provided to protrude from the upper face of the substrate, the light incident portion being a portion on which the light of the light emitting element is incident, and
   a light transmitting portion transmitting the light in a direction away from the end face of the substrate;
   the panel includes an opening exposing the light transmitting portion of the light guide body on the side of the front face of the panel;
   the opening and the end face of the substrate are provided to face each other; and
   the light guide body is provided between the opening and the end face of the substrate.

3. The display device according to claim 2, wherein:
   the opening is provided as a hole penetrating the panel in a thickness direction of the panel; and
   the light transmitting portion is fitted in the opening.

4. The display device according to claim 1, wherein the light guide body is temporarily fixed to the panel.

5. The display device according to claim 1, wherein:
   the light guide body includes a cover member covering the light guide body to prevent light leakage;
   the substrate includes an end portion; and
   the cover member includes a concave portion in which the end portion of the substrate is fitted.

6. The display device according to claim 5, wherein:
   the end portion of the substrate includes a cutout portion; and
   the cutout portion and the concave portion are fitted in each other.

7. An electronic apparatus comprising:
   the display device according to claim 1; and
   a terminal component exposed on the front face of the panel, the terminal component being mounted on the substrate.

8. A light guide unit comprising:
   a light guide body including:
   a front face;
   a back face;
   a light incident portion on the back face; and
   a light transmitting portion on the front face, the light guide body guiding light incident through the light incident portion to the light transmitting portion and transmitting the light; and
   a cover member including:
   a front face;
   a back face;
   a mounting surface for a panel, on a side of the front face; and
   a concave portion in which an end portion of a substrate is fitted, on a side of the back face, the concave portion having substantially a same height as the light transmitting portion, the cover member surrounding upper, lower, right, and left side portions of the light guide body to prevent light leakage.

9. The light guide unit according to claim 8, wherein the light incident portion, when the substrate is fitted in the concave portion, is provided at a position at which light of a light emitting element provided on the substrate is incident.

10. The light guide unit according to claim 8, wherein the light transmitting portion is provided in a convex shape that protrudes from the mounting surface and is also provided so as to be inserted to an opening provided in the panel.

* * * * *